United States Patent Office 2,866,761
Patented Dec. 30, 1958

2,866,761

POLYMERIZATION OF EPOXIDES

Fred N. Hill, South Charleston, and John T. Fitzpatrick, Charleston, W. Va., assignors to Union Carbide Corporation, a corporation of New York No Drawing. Application April 5, 1957
Serial No. 650,854

27 Claims. (Cl. 260—2)

This invention relates to the polymerization of epoxide compounds. In one aspect this invention relates to the process of polymerizing epoxide compounds in the presence of a metal chelate catalyst.

Methods commonly employed in the polymerization of ethylene oxide with various catalysts are well recognized to the art; however, the resulting products are relatively low molecular weight polymers possessing reduced viscosities in acetonitrile up to about 0.2. The polymers produced by our novel method have reduced viscosities of at least 0.5. The polymers of ethylene oxide possessing a reduced viscosity of approximately 1.0 and higher are hard, tough, horny, water-soluble materials useful as thickeners, binders and water-soluble lubricants and for the production of various shaped articles. The lower alkylene oxide polymers are also useful for the production of various shaped articles.

As is known, reduced viscosity, a value obtained by dividing the specific viscosity by the concentration of the polymer in the solution, the concentration being measured in grams of polymer per 100 ml. of solvent, is regarded as a measure of molecular weight. The specific viscosity is obtained by dividing the difference between the viscosity of the solution and the viscosity of the solvent by the viscosity of the solvent. The reduced viscosities herein referred to are measured at a concentration of 0.2 gram of polymer in 100 ml. of solvent at 30° C. The reduced viscosities of the ethylene oxide polymers are measured in acetonitrile; those of other epoxide polymers produced by our method are measured in benzene.

In accordance with the present invention we have discovered a method wherein certain divalent metal chelate catalysts are employed to polymerize epoxides such as alkylene oxides, e. g., ethylene oxide, propylene oxide, the epoxy butanes and the like; aryl-substituted epoxides such as styrene oxide and the like, to form high molecular weight products having reduced viscosities of at least 0.5. Our process is particularly adapted to produce polymers having reduced viscosities in the range from about 0.5 to about 10, and higher, and preferably from about 1.0 to about 10. The epoxy polymers produced can have molecular weights corresponding up to several hundred thousand.

The metal chelates contemplated in our invention are the metal salts of enols or phenols which contain a carbonyl group and in which the enolic or phenolic oxygen is attached to the carbon atom beta to the carbonyl group, the metal portion of the chelate compound being a group II–A element having an atomic number greater than 19 and less than 57.

Accordingly, one or more of the following objects will be achieved by the practice of our invention. It is an object of this invention to provide a novel process for the polymerization of epoxide compounds. It is also an object of this invention to provide a novel process of polymerizing an alkylene oxide, i. e., olefin oxide, in the presence of certain divalent metal chelate catalysts. It is a further object of this invention to produce alkylene oxide polymers having reduced viscosities in the range from about 0.5 to about 10 and higher. A still further object of this invention is to provide a novel process for the polymerization of ethylene oxide in the presence of a metal chelate catalyst which catalyst is a metal salt of an enol or phenol which contain a carbonyl group and in which the enolic or phenolic oxygen is attached to the carbon atom beta to the carbonyl group, the metal portion of the chelate compound being a group II–A element having an atomic number greater than 19 and less than 57. It is likewise an object of this invention to effect the polymerization of alkylene oxide with a metal chelate catalyst soluble therein, to prepare polymers containing negligible quantities of entrained catalyst. Other objects will become apparent to those skilled in the art in the light of the instant specification.

The metal chelates which we employ as catalysts in our method are the chelates of certain divalent metals, namely, calcium, strontium and barium, wherein the chelating agent of said catalysts is a hydroxylic compound selected from the group of organic enolic and phenolic compounds which contain a carbonyl group and in which the hydroxylic group is attached to the carbon atom beta to the carbonyl group. The chelating agent, an unsaturated organic hydroxy carbonyl compound, can be characterized by the structural group:

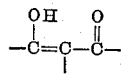

Those chelating agents which are suitable to form the metal chelate catalyst of this invention include, among others, the ester of beta-keto acids, beta-diketones, o-hydroxyphenol carbonyl compounds, the amides of beta-keto acids and the like.

In one aspect, the catalyst employed is a metal chelate compound, the metal portion of said compound being selected from the group consisting of barium, strontium and calcium, the chelating agent of said compound being represented by the following structural formula:

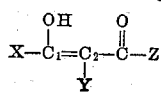

wherein Y is a member selected from the group consisting of hydrogen, alkyl and aryl; wherein X is a member selected from the group consisting of alkyl and aryl; and wherein Z is a member selected from the group consisting of alkyl, alkoxy, aryl, aryloxy, and the unit

wherein each $R_1$ and $R_2$, individually, is selected from the group consisting of hydrogen, alkyl, aryl, alkaryl and alkoxyaryl, except that when the variables X and Y together with the carbon atoms designated as $C_1$ and $C_2$ form a benzene nucleus, then Z is selected from the group consisting of hydrogen, alkyl and alkoxy.

The esters of beta-keto acids can be represented by the following structural equilibrium equation:

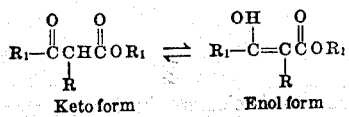

Keto form      Enol form wherein R is selected from the group consisting of hydrogen, an alkyl radical such as methyl, ethyl, propyl, butyl, hexyl and the like, and an aryl radical such as phenyl, tolyl, xylyl, and the like; and each $R_1$ is individually selected from the group consisting of an alkyl radical such as methyl, ethyl, propyl, butyl, hexyl, octyl, and the like, and an aryl radical such as phenyl, tolyl, xylyl, and the like. Illustrative of the compounds which can be employed are methyl acetoacetate, ethyl acetoacetate, propyl acetoacetate, butyl acetoacetate, ethyl propionylacetate, butyl-α-acetopropionate, amyl-α-acetobutyrate, propyl-αbutyrylbutyrate, butyl-α-propionylbutyrate, ethyl benzylacetoacetate, ethyl - α - (phenylaceto) propionate, propyl benzoylacetate, and the like.

The beta-diketone chelating agents can be represented by the following structural equilibrium equation:

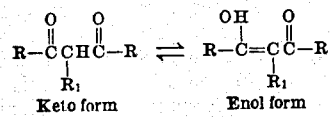

Keto form      Enol form wherein each R is individually selected from the group consisting of an alkyl radical such as methyl, ethyl, propyl, butyl, hexyl, octyl and the like, and an aryl radical such as phenyl, tolyl, xylyl, and the like; and wherein $R_1$ is selected from the group consisting of hydrogen, an alkyl radical such as methyl, ethyl, butyl, hexyl, octyl, and the like, and an aryl radical such as phenyl, tolyl, xylyl, and the like. Organic beta-diketone compounds which can be employed include, among others, 2,4-pentanedione, 3-methyl 2,4-pentanedione, 2,4-hexanedione, 3-propyl 2,4-heptanedione, 3,5-heptanedione, benzoylacetone, and the like.

The o-hydroxyphenyl carbonyl compounds useful as the chelating agent to form the metal chelate catalyst are represented by the following structural formula:

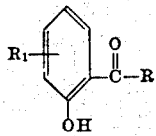

wherein R is selected from the group consisting of hydrogen, an alkyl radical such as methyl, ethyl, butyl, amyl, heptyl, and the like, and an alkoxy radical such as methoxy, propoxy, butoxy, hexoxy and the like; and $R_1$ is selected from the group consisting of hydrogen, an alkyl radical and an alkoxy radical, such as methyl, ethyl, propyl, butyl, hexyl, methoxy, ethoxy, propoxy, hexoxy, octoxy and the like. Illustrative compounds include o-hydroxyacetophenone, o-hydroxypropiophenone, o-hydroxybutyrophenone, p - methyl-o-hydroxyacetophenone, p - propoxy-o-hydroxypropiophenone, p-butyl-o-hydroxyacetophenone, p-butoxy-o-hydroxypropiophenone, salicylaldehyde, 2-hydroxy-p-toluic aldehyde, ethyl-o-hydroxybenzoate, butyl-o-hydroxybenzoate and the like.

The amides of beta-keto acids are depicted in the following structural equilibrium equation:

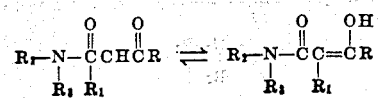

wherein R is an alkyl radical such as methyl, ethyl, propyl, butyl, hexyl, octyl or an aryl radical such as phenyl, tolyl, xylyl, and the like; $R_1$ is selected from the group consisting of hydrogen and an alkyl radical such as methyl, ethyl, butyl, hexyl, octyl and the like; and $R_2$ and $R_3$ are individually selected from the group consisting of hydrogen, an alkyl radical, and an aryl radical, including alkyl- and alkoxy-substituted aryl radicals, and including, for example, methyl, propyl, hexyl, octyl, phenyl, tolyl, xylyl, butylphenyl, propoxyphenyl, and the like. Illustrative compounds are acetoacet-p-aniside, acetoacet-p-phenetide, acetoacetanilide, acetoacet-p-toluide, N-ethyl acetoacetamide, and the like.

As set forth previously, the metal chelate catalysts of our invention are certain metal salts of enols or phenols which contain a carbonyl group and in which the enolic or phenolic oxygen is attached to the carbon atom beta to the carbonyl group. In the above discussion exemplifying the o-hydroxyphenyl carbonyl compounds, the phenolic oxygen is attached to a carbon atom which is beta to the carbonyl group by counting the carbon atoms on the benzene ring which separate the hydroxyl group and the carbonyl group. In the other exemplified cases, the enolic oxygen is attached to a carbon atom which is beta to the carbonyl group by counting the carbon atoms along the aliphatic chain which separate the hydroxyl group and the carbonyl group. Thus, the structural group of the chelating agents can be represented

an unsaturated organic hydroxy carbonyl compound, in which the carbon carbon double bond can be a part of an aromatic ring.

The chelating agents exemplified above have two donor groups and form with the metal, i. e., calcium, strontium and barium, bidendate chelates. The structure of the metal chelate is believed to encompass 2 six membered rings with the metal common to both rings and bonded to oxygen atoms with unsaturation present in each ring. The metal chelates can be structurally depicted as follows:

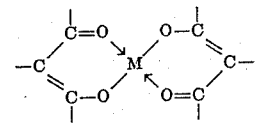

wherein M is the metal, i. e., calcium, strontium and barium.

The metal chelate catalysts should be free from chemical activity toward alkylene oxide such as active hydrogen. It is desirable to protect the catalysts from the air in order to prevent loss of catalytic activity. Excessive exposure to carbon dioxide and water vapor tends to decrease the activity of the catalyst.

The mode of preparation of the metal chelate catalysts does not appear to be narrowly critical and their preparations are well recognized in the art. For example, the addition of strontium acetate solution to freshly prepared sodium ethyl acetoacetate, with subsequent filtration of the precipitate, followed by drying will yield strontium ethyl acetoacetate chelate.

The catalyst is employed in catalytic quantities, and, in general, a catalyst concentration in the range from about 0.005 to about 1.0 percent by weight based on the weight of monomeric feed is suitable. A catalyst concentration range from about 0.02 to about 0.5 percent by weight is preferred.

A variety of advantages result in the carrying out of the polymerization process, and in the polymers obtained from said process. The metal chelate catalysts, in the main, are soluble in monomeric ethylene oxide at the preferred concentrations. Consequently, homogeneous polymerization can be carried out in continuous fashion. The solubility characteristic of the catalyst in the monomeric feed results in better contact and dispersion throughout said feed. The finished polymer is only slightly contaminated with catalyst. This result is of particular value in applications where the polymer is used in solution because a much clearer solution results rather than an opaque suspension, such as, for example, in the production of films and thickening formulations when it is generally undesirable to employ a polymer containing catalyst aggregates or undue catalyst suspension.

As a practical matter, catalyst concentrations are chosen to give optimum balance between polymer quality and speed of reaction. For example, with calcium butyl acetoacetate chelate polymerization of 4 to 6 percent per hour can be obtained at a catalyst concentration of about 0.07 percent by weight resulting in polymer products having a reduced viscosity of 4.5. Too high a catalyst concentration may cause the polymerization reaction to proceed at a dangerously high rate or may lead to the production of low molecular weight products. On the other hand, an insufficient catalyst concentration may lead to long induction periods, and to excessively slow polymerization rates.

We prefer to conduct the polymerization reaction at somewhat elevated temperatures. The temperature range from about 70° C. to about 150° C. is satisfactory; the preferred temperature range is from about 90° C. to about 150° C.

The polymerization reaction takes place in the liquid phase and a pressure above atmospheric is generally employed to maintain the liquid phase. However, in the usual case, external pressure is unnecessary, and it is necessary only to employ a reaction vessel capable of withstanding the autogenous pressure of the reaction mixture.

Our method can be used as a bulk polymerization process and can also be employed in various processes where an inert diluent is used.

One such class of diluents, in which both monomeric ethylene oxide and the polymers produced are soluble, are those such as benzene, alkyl substituted-benzenes, and chlorobenzene. These are used in amounts varying from 5 to 95 percent by weight of the total charge. The use of the above-mentioned diluents in the polymerization of epoxides is the subject matter of the application entitled "Solvent Polymerization of Ethylene Oxide," by W. A. Denison, Serial No. 587,951, filed May 29, 1956, now abandoned, and assigned to the same assignee as the instant application.

Both ethylene oxide and the polymers formed are also soluble in anisole and, at least at temperatures above 90° C., in ethers such as dimethyl and diethyl ethers of glycols such as ethylene glycol, propylene glycol and diethylene glycol. The process using such solvents in amounts varying from 5 to 95 percent by weight of the total charge is the subject matter of the application entitled "Solvent Polymerization of Ethylene Oxide," by F. E. Bailey, Jr., Serial No. 587,952, filed May 29, 1956, and assigned to the same assignee as the instant application.

An induction period may be observed in that the polymerization is not initiated instantaneously. The induction period may be as short as minutes in length with the more active catalysts or it may be as long as 24 hours or more. This induction period depends not only on the particular catalyst employed but also on the concentration of the catalyst, the reaction temperature employed, and the purity of the epoxide to be polymerized.

The ethylene oxide polymers, throughout the range of reduced viscosities from about 1 to about 10 and greater, are all water-soluble. They appear to form homogeneous systems with water in all proportions, although the higher molecular weight products merely swell on the addition of small amounts of water. On the addition of greater amounts of water, the polymers pass into solution. The water solutions are viscous, the viscosity increasing both with the concentration of the polymer in the solution and the reduced viscosity of the polymer. These polymers of ethylene oxide show little change in melting point with increased reduced viscosity (increased molecular weight) and the melting point, as measured by change in stiffness with temperature, is found to be about 65° ± 2° C. throughout the range of reduced viscosities of from 1 to 10 and greater. These polymers, upon X-ray examination, show the sort of crystallinity exhibited by polyethylene. The crystallization temperature, as determined from measuring the break in the cooling curve, is about 55° C. The ethylene oxide polymers produced by the present method are soluble in water, acetonitrile, chloroform, formaldehyde, methanol, and mixtures of water and the higher alcohols. They are insoluble in acetone, methyl ethyl ketone, ethyl acetate, and carbon tetrachloride.

In the illustrative examples the procedure normally employed to prepare the polymer was to use a 9-inch Pyrex tube 22 mm. in diameter sealed at one end and fitted at the other with a 3-inch piece of 8 mm. Pyrex tubing. The usual charge of epoxide was 30 grams. The tubes were cleaned, dried and flushed with dry nitrogen before charging. A weighed quantity of catalyst was then introduced into the tubes. The tubes were then filled in a "dry box" containing a nitrogen atmosphere, the quantity of oxide employed being measured volumetrically. After the tubes were filled, they were sealed with rubber caps, cooled in Dry Ice-acetone bath and sealed under the vacuum thus obtained. The sealed tubes were then rocked in a water bath or in a moving aluminum block at some determined temperature and for a known time. After this, the tubes were cracked open and the polymer was removed for examination.

EXAMPLE I

*Preparation of calcium butyl acetoacetate chelate*

Twenty-seven grams of calcium acetate monohydrate and 64 grams of concentrated (30%) ammonium hydroxide were dissolved in 700 cc. of distilled water in a one-liter, 4-neck flask with attached mechanical stirrer. Forty-eight grams of butyl acetoacetate was fed dropwise into the stirred calcium acetate solution over a period of 15 minutes. A precipitate formed immediately on first addition of butyl acetoacetate. The precipitate was filtered and washed twice with distilled water, then dried at room temperature under 0.1 mm. of Hg for 20 hours. The product was a white, essentially non-hygroscopic powder. A melting point of 171° C.–173° C. was observed.

Modifications of the method of Example I are suitable in most cases to produce the metal chelates employed as catalysts in our polymerization reaction.

EXAMPLE II

Twenty milligrams of calcium butyl acetoacetate chelate was dissolved in 30 grams of ethylene oxide and sealed in a glass tube, using precautions to exclude air, moisture, and carbon dioxide. The tube was heated to 100° C. in a steam bath and continually given agitation by rocking. After 23 hours all monomer was converted to polymer. The polymer was crystal clear at 100° C.; it hardened and became opaque on cooling to room temperature. The reduced viscosity of the polymer, measured at 0.2% concentration in acetonitrile, was 4.5.

Examples I and II serve to illustrate the ease of catalyst preparation and handling and the efficiency of the catalyst in producing the desired polymer with little catalyst contamination and at commercially feasible rates.

EXAMPLE III

Thirty grams of ethylene oxide and 100 milligrams of barium ethyl acetoacetate chelate were charged to a reaction vessel. After 18 hours at 100° C., a polymer having a reduced viscosity of 0.6 was obtained.

EXAMPLE IV

Thirty grams of freshly redistilled ethylene oxide and 20 milligrams of strontium ethyl acetoacetate chelate were placed in a glass tube and sealed. The catalyst dissolved in the ethylene oxide to form a clear solution. The tube was rocked at 100° C. for 32 hours, and 70% of the monomer was converted to polymer. The product was white and had a reduced viscosity of 2.1. At temperatures above about 65° C. the polymer was transparent.

EXAMPLE V

A charge of 30 grams of ethylene oxide and 20 milligrams of strontium pentanedionate chelate was placed in a glass tube and sealed. After rocking at 100° C. for 40 hours the monomer was 90% converted to polymer having a reduced viscosity of 0.8 and possessing the same physical characteristics as the product of Example IV.

EXAMPLE VI

A charge of 30 grams of ethylene oxide and 20 milligrams of strontium o-hydroxyacetophenone chelate was prepared as described in Examples IV and V. After rocking at 100° C. for 70 hours, the monomer was completely converted to polymer having a reduced viscosity of 5.0.

EXAMPLE VII

Thirty grams of ethylene oxide and 20 milligrams of calcium acetoacet-p-aniside chelate were placed in a glass tube and sealed. The catalyst was not completely soluble in the monomer. After rocking at 100° C. for 24 hours, the monomer was 50% converted to polymer having a reduced viscosity of 4.1.

EXAMPLE VIII

Acetoacet-p-phenetide was dissolved in an equivalent quantity of aqueous sodium hydroxide, and calcium acetoacet-p-phenetide chelate was precipitated by addition of calcium acetate solution.

Tested at a catalyst concentration of 0.05 percent by weight in ethylene oxide, the above metal chelate catalyst totally converted the monomer in 16 hours at 100° C. to polymer having a reduced viscosity of 4.0.

It is obvious that various modifications of our invention can be made without departing from the spirit and scope thereof.

What is claimed is:

1. A process which comprises contacting alkylene oxide with a catalytic quantity of a metal chelate compound, the metal portion of said compound being selected from the group consisting of barium, strontium, and calcium, the chelating agent of said compound being a hydroxylic compound selected from the group consisting of enolic and phenolic compounds which contain a carbonyl group and in which the hydroxylic group is attached to the carbon atom beta to the carbonyl group, for a period of time sufficient to produce poly(alkylene oxide).

2. A process which comprises contacting alkylene oxide with a catalytic quantity of a metal chelate compound, the metal portion of said compound being selected from the group consisting of barium, strontium and calcium, the chelating agent of said compound being represented by the following structural formula:

$$X-\underset{Y}{\overset{OH}{C_1}}=\overset{}{C_2}-\overset{O}{\overset{\|}{C}}-Z$$

wherein Y is a member selected from the group consisting of hydrogen, alkyl and aryl; wherein X is a member selected from the group consisting of alkyl and aryl; and wherein Z is a member selected from the group consisting of alkyl, alkoxy, aryl, aryloxy, and the unit $$-\underset{R_2}{\overset{}{N}}-R_1$$

wherein each $R_1$ and $R_2$, individually, is selected from group consisting of hydrogen, alkyl, aryl, alkaryl and alkoxyaryl, except that when the variables X and Y together with the carbon atoms designated as $C_1$ and $C_2$ form a benzene nucleus, then Z is selected from the group consisting of hydrogen, alkyl, and alkoxy; for a period of time sufficient to produce poly(alkylene oxide).

3. The process of claim 2 wherein said alkylene oxide is ethylene oxide.

4. A process which comprises contacting a monomeric epoxide compound selected from the group consisting of lower alkylene oxides and aryl-substituted lower alkylene oxides with a catalytic quantity of a metal chelate catalyst, the metal portion of said catalyst being selected from the group consisting of barium, strontium, and calcium, the chelating agent of said catalyst being selected from the group consisting of esters of beta-keto acids, beta-diketones, ortho-hydroxyphenyl carbonyl compounds, and amides of beta-keto acids, for a period of time sufficient to polymerize said monomeric epoxide compound.

5. The process of claim 4 wherein said monomeric epoxide compound is ethylene oxide.

6. The process of claim 1 wherein said chelating agent is an ester of a beta-keto acid.

7. The process of claim 1 wherein said chelating agent is a beta-diketone.

8. The process of claim 1 wherein said chelating agent is an ortho-hydroxyphenyl carbonyl compound.

9. The process of claim 1 wherein said chelating agent is an amide of a beta-keto acid.

10. The process of polymerizing a lower alkylene oxide which comprises contacting a lower alkylene oxide at a temperature in the range from about 70° C. to about 150° C. with a metal chelate catalyst, the metal portion of said catalyst being selected from the group consisting of barium, strontium, and calcium, the chelating agent of said catalyst being a hydroxylic compound selected from the group consisting of enolic and phenolic compounds which contain a carbonyl group and in which the hydroxylic group is attached to the carbon atom beta to the carbonyl group.

11. The process of claim 10 wherein said lower alkylene oxide is ethylene oxide.

12. The process of claim 11 wherein said metal chelate catalyst is calcium butyl acetoacetate chelate.

13. The process of claim 11 wherein said metal chelate catalyst is strontium ethyl acetoacetate chelate.

14. The process of claim 11 wherein said metal chelate catalyst is strontium pentanedionate chelate.

15. The process of claim 11 wherein said metal chelate catalyst is strontium ortho-hydroxyacetophenone chelate.

16. The process of claim 11 wherein said metal chelate catalyst is calcium acetoacet-p-aniside chelate.

17. The process of claim 11 wherein said metal chelate catalyst is calcium acetoacet-p-phenetide chelate.

18. A process for preparing a polymer with a reduced viscosity greater than about 0.5 from a lower alkylene oxide which comprises contacting a lower alkylene oxide at a temperature in the range from about 70° C. to about 150° C. with about 0.005 to about 1.0 percent by weight, based on the weight of the lower alkylene oxide, of a metal chelate catalyst, the metal portion of said catalyst being selected from the group consisting of barium, strontium and calcium, the chelating agent of said catalyst being a hydroxylic compound selected from the group consisting of enolic and phenolic compounds which contain a carbonyl group and in which the hydroxylic group is attached to the carbon atom beta to the carbonyl group.

19. The process of claim 18 wherein the polymerization reaction is effected at a temperature in the range from about 90° C. to 150° C.

20. The process of claim 18 wherein said catalyst concentration is in the range from about 0.02 to about 0.5 percent by weight based on the weight of said lower alkylene oxide.

21. The process of claim 18 wherein said lower alkylene oxide is ethylene oxide.

22. The process of claim 21 wherein said metal chelate catalyst is calcium butyl acetocetate chelate.

23. The process of claim 21 wherein said metal chelate catalyst is strontium ethyl acetoacetate chelate.

24. The process of claim 21 wherein said metal chelate catalyst is strontium pentanedionate chelate.

25. The process of claim 21 wherein said metal chelate catalyst is strontium ortho-hydroxyacetophenone chelate.

26. The process of claim 21 wherein said metal chelate catalyst is calcium acetoacet-p-aniside chelate.

27. The process of claim 21 wherein said metal chelate catalyst is calcium acetoacet-p-phenetide chelate.

References Cited in the file of this patent
UNITED STATES PATENTS
2,801,228   Starck et al. _____ July 30, 1957